(12) United States Patent
Ishikawa

(10) Patent No.: US 9,956,961 B2
(45) Date of Patent: May 1, 2018

(54) VEHICLE DRIVING ASSISTANCE APPARATUS AND VEHICLE DRIVING ASSISTANCE METHOD

(71) Applicant: Alpine Electronics, Inc., Tokyo (JP)

(72) Inventor: Shota Ishikawa, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 28 days.

(21) Appl. No.: 14/708,868

(22) Filed: May 11, 2015

(65) Prior Publication Data

US 2015/0353088 A1 Dec. 10, 2015

(30) Foreign Application Priority Data

Jun. 5, 2014 (JP) ................................ 2014-116332

(51) Int. Cl.
*B60W 30/182* (2012.01)
*B60W 40/06* (2012.01)
*G05D 1/00* (2006.01)

(52) U.S. Cl.
CPC .......... *B60W 30/182* (2013.01); *B60W 40/06* (2013.01); *G05D 1/0061* (2013.01); *B60W 2550/14* (2013.01); *G05D 2201/0213* (2013.01)

(58) Field of Classification Search
CPC .................................................. G05D 1/0061
See application file for complete search history.

(56) References Cited

U.S. PATENT DOCUMENTS

| | | | | |
|---|---|---|---|---|
| 4,554,498 A * | 11/1985 | Fujiwara | .............. | G05D 1/0234 318/480 |
| 6,154,152 A * | 11/2000 | Ito | .......................... | G01C 21/32 340/988 |
| 6,347,266 B1 * | 2/2002 | Kageyama | ............... | B62D 1/28 340/435 |

(Continued)

FOREIGN PATENT DOCUMENTS

| | | | | |
|---|---|---|---|---|
| DE | 10 2009 050 399 A1 * | 4/2011 | ............ | B60W 50/08 |
| FR | 3005924 A1 * | 11/2014 | ............ | B60W 50/14 |

(Continued)

OTHER PUBLICATIONS

Notification of Reasons for Refusal for Japanese Patent Application No. 2014-116332 (with English Translation) dated Jan. 9, 2018 (11 pgs).

*Primary Examiner* — John Olszewski
*Assistant Examiner* — Thomas E Worden
(74) *Attorney, Agent, or Firm* — Brinks Gilson & Lione

(57) ABSTRACT

An in-vehicle system includes a vehicle position detection unit and a vehicle position calculation unit that detect a vehicle position, a road condition prediction unit that predicts a road condition at a position in front of the detected vehicle position, an automatic driving continuation determination unit that determines whether or not the vehicle automatic driving can be continued at the position in front of the vehicle based on the road condition predicted by the road condition prediction unit, and an automatic driving cancellation warning unit that warns of cancellation of the vehicle automatic driving when the automatic driving continuation determination unit determines that it is difficult to continue the vehicle automatic driving.

19 Claims, 4 Drawing Sheets

(56) References Cited

U.S. PATENT DOCUMENTS

| | | | |
|---|---|---|---|
| 8,672,582 B2* | 3/2014 | Loew | E01C 19/262 404/84.05 |
| 2001/0007967 A1* | 7/2001 | Yamamoto | B60H 1/00771 701/409 |
| 2003/0045982 A1* | 3/2003 | Kondo | B62D 15/025 701/41 |
| 2005/0109882 A1* | 5/2005 | Armbruster | B61L 3/006 246/167 R |
| 2006/0087176 A1* | 4/2006 | Duong | B60T 7/00 303/191 |
| 2006/0089763 A1* | 4/2006 | Barrett | G05D 1/0061 701/23 |
| 2006/0089764 A1* | 4/2006 | Filippov | G05D 1/027 701/23 |
| 2006/0089766 A1* | 4/2006 | Allard | G05D 1/0061 701/23 |
| 2006/0089800 A1* | 4/2006 | Svendsen | G05D 1/027 701/301 |
| 2006/0239509 A1* | 10/2006 | Saito | G06K 9/6205 382/104 |
| 2007/0198145 A1* | 8/2007 | Norris | H04L 67/12 701/23 |
| 2008/0189000 A1* | 8/2008 | Duong | B60T 7/22 701/20 |
| 2010/0087998 A1* | 4/2010 | Habert | F16H 61/0213 701/64 |
| 2014/0156133 A1* | 6/2014 | Cullinane | B60W 30/00 701/23 |
| 2014/0184798 A1* | 7/2014 | Wedajo | G06K 9/00791 348/148 |
| 2014/0303827 A1* | 10/2014 | Dolgov | B60W 30/00 701/23 |
| 2016/0026180 A1* | 1/2016 | Tsimhoni | G05D 1/0061 701/23 |
| 2016/0033964 A1* | 2/2016 | Sato | B60K 28/06 701/24 |
| 2016/0103449 A1* | 4/2016 | Desnoyer | B60W 30/12 701/23 |
| 2016/0107655 A1* | 4/2016 | Desnoyer | B60W 50/14 701/23 |
| 2016/0121907 A1* | 5/2016 | Otake | B60W 50/14 701/23 |
| 2016/0159396 A1* | 6/2016 | Watanabe | B62D 1/046 701/36 |
| 2016/0229414 A1* | 8/2016 | Desnoyer | B60W 30/09 |
| 2016/0311429 A1* | 10/2016 | Holland-Letz | B62D 15/0285 |
| 2016/0368534 A1* | 12/2016 | Harda | B62D 15/025 |
| 2017/0072950 A1* | 3/2017 | Sim | B60W 30/09 |

FOREIGN PATENT DOCUMENTS

| | | | |
|---|---|---|---|
| FR | 3005925 A1 * | 11/2014 | B60W 30/12 |
| JP | 10-315801 A | 2/1998 | |
| JP | H10-309961 | 11/1998 | |
| JP | 2011-118603 | 6/2011 | |
| KR | 20090060125 A * | 6/2009 | |

* cited by examiner

VEHICLE DRIVING ASSISTANCE APPARATUS AND VEHICLE DRIVING ASSISTANCE METHOD

BACKGROUND

The present application claims priority to Japanese Patent Application No. 2014-116332, filed on Jun. 5, 2014, the entirety of which is hereby incorporated by reference.

BACKGROUND

Field

The present disclosure relates to a vehicle driving assistance apparatus, a vehicle driving assistance method, and a vehicle driving assistance program that cancel vehicle automatic driving and switch to manual driving.

Description of the Related Art

Recently, studies of vehicle automatic driving have progressed, and methods for switching between automatic driving and manual driving according to certain needs have been proposed. For example, an automatic traveling vehicle control device is known that controls a shift from an automatic traveling mode to a manual traveling mode by gradually reducing the ratio, in while vehicle is traveling, of contribution by the vehicle traveling control of the vehicle traveling in the automatic traveling mode when a driver switches the mode during automatic driving (for example, see JP 10-309961 A). This traveling mode shifting helps to shift to the manual traveling mode after the driver accustoms himself to the driving operation.

SUMMARY

In the automatic traveling vehicle control device disclosed in JP 10-309961 A, since the timing of switching from the automatic traveling mode to the manual traveling mode is determined by a mode switching operation by the driver, there has been a problem that, when the automatic traveling mode is canceled without regard to the driver's will, the driver cannot be prepared in advance to shift to the manual driving. For example, consider a vehicle that executes automatic driving by detecting white lines on the roads, such that the vehicle cannot continue the automatic driving based on the while line detection if there is snow on the road after passing through a tunnel. In such a case, the automatic driving is cancelled and switched to manual driving; however, if the automatic driving is suddenly cancelled at the time when the white lines cannot be detected after exiting the tunnel, the driver may not be ready for manual driving and cannot accustom himself for the driving operation before shifting to the manual traveling mode, such that the expected effects cannot be achieved with the device disclosed in JP 10-309961 A.

The present disclosure has been made in view of the above problem and provides a vehicle driving assistance apparatus, a vehicle driving assistance method, and a vehicle driving assistance program that allow a driver to be prepared in advance when switching from automatic driving to manual driving.

A vehicle driving assistance apparatus according to the present disclosure includes a vehicle position detector configured to detect a vehicle position; a road condition predictor configured to predict a road condition at a position in front of the vehicle position detected by the vehicle position detector; an automatic driving continuation determiner configured to determine whether or not vehicle automatic driving can be continued at the position in front based on the road condition predicted by the road condition predictor; and an automatic driving cancellation warner configured to warn of vehicle automatic driving cancellation when the automatic driving continuation determiner determines that it is difficult to continue the vehicle automatic driving.

Further, a vehicle driving assistance method according to the present disclosure includes: predicting, by a road condition predictor, a road condition at a position in front of a vehicle position detected by a vehicle position detector; determining, by an automatic driving continuation determiner, whether or not vehicle automatic driving can be continued at the position in front of the vehicle based on the road condition predicted by the road condition predictor; and warning, by an automatic driving cancellation warner, of cancellation of the vehicle automatic driving when the automatic driving continuation determiner determines that it is difficult to continue the vehicle automatic driving.

Further, a vehicle driving assistance program according to the present disclosure causes a computer to function as: a road condition predictor for predicting a road condition at a position in front of a vehicle position detected by a vehicle position detector; an automatic driving continuation determiner for determining whether or not vehicle automatic driving can be continued at the position in front of the vehicle based on the road condition predicted by the road condition predictor; and an automatic driving cancellation warner for warning cancellation of the vehicle automatic driving when the automatic driving continuation determiner determines that it is difficult to continue the vehicle automatic driving.

Since it is determined in advance that the continuation of the automatic driving becomes difficult at the position in front of the vehicle while the vehicle is traveling by automatic driving, and automatic driving cancellation is warned in advance, the driver can be prepared for automatic driving cancellation beforehand. Further, the driver can intentionally switch from automatic driving to manual driving in response to the warning.

In addition, it is preferable that a communicator configured to communicate with an external device and obtain information used to predict a road condition is further included and that the road condition predictor predicts the road condition based on the information obtained from the external device. By predicting a road condition based on the information obtained from the external device, an accurate prediction reflecting real-time changes of road conditions can be achieved.

Further, it is preferable that the automatic driving cancellation warner as described above warns of cancellation when a distance to the position in front of the vehicle where it is determined that the vehicle automatic driving is difficult becomes equal to or less than a predetermined value. By warning of the cancellation at a a certain distance from the position where the automatic driving continuation is difficult, the driver can prepare in advance for the automatic driving cancellation while travelling the certain distance.

Moreover, it is preferable to further include an automatic driving controller configured to control the vehicle automatic driving, and an automatic driving canceller configured to cancel the automatic driving control by the automatic driving controller at a point before the position in front of the vehicle where it is determined that the vehicle automatic driving is difficult, and after the warning of the cancellation by the automatic driving cancellation warner. Since the automatic driving is cancelled after the cancellation warning, the driver can calmly shift to manual driving after the automatic driving is canceled.

Further, the information that is obtained by the communicator and used to predict the road condition is preferably weather information in an area around the vehicle. It is preferable that the automatic driving continuation determiner determines that it is difficult to continue the vehicle automatic driving when the obtained weather information indicates at least one of a snow-covered road condition and an icy road. Regarding traveling on a snow-covered road or an icy road, it is preferable to cancel the automatic driving in order to be ready for unexpected situations. Thus, by obtaining weather information, especially information of a snow-covered condition and an icy road in advance and predicting the road condition, the automatic driving cancellation warning can be executed at the right time.

Further, it is preferable that the automatic driving continuation determiner determines whether or not the vehicle automatic driving can be continued at a position in front corresponding to at a tunnel exit or a road on a bridge. A sudden snow-covered condition may often occur near a tunnel exit and an icy road may often occur on a bridge. Thus, by focusing on these points, it becomes possible to determine accurately or with an allowance a situation where it is difficult to continue the automatic driving.

Further, the information that is obtained by the communicator and used to predict the road condition is preferably road traffic information including a congesting area, a jamming area, a construction area, or an accident occurrence area of streets. Since it is difficult to predict when and how such congestion, jam, construction, accident or the like occurs, it is preferable to cancel the automatic driving and handle those conditions by driving manually. Thus, by obtaining the information in advance and by predicting the road condition, an automatic driving cancellation warning can be executed at the right time.

Further, it is preferable to further include a map display configured to display a map image of an area around the vehicle position detected by the vehicle position detector and the position in front of the vehicle, when it is determined that it is difficult to continue the automatic driving. With this configuration, the position in front of the vehicle where it is difficult to continue the automatic driving can be confirmed on the map image and the driver can be prepared for the automatic driving cancellation before the vehicle arrives at the position in front of the vehicle.

DETAILED DESCRIPTION

Figure 1:
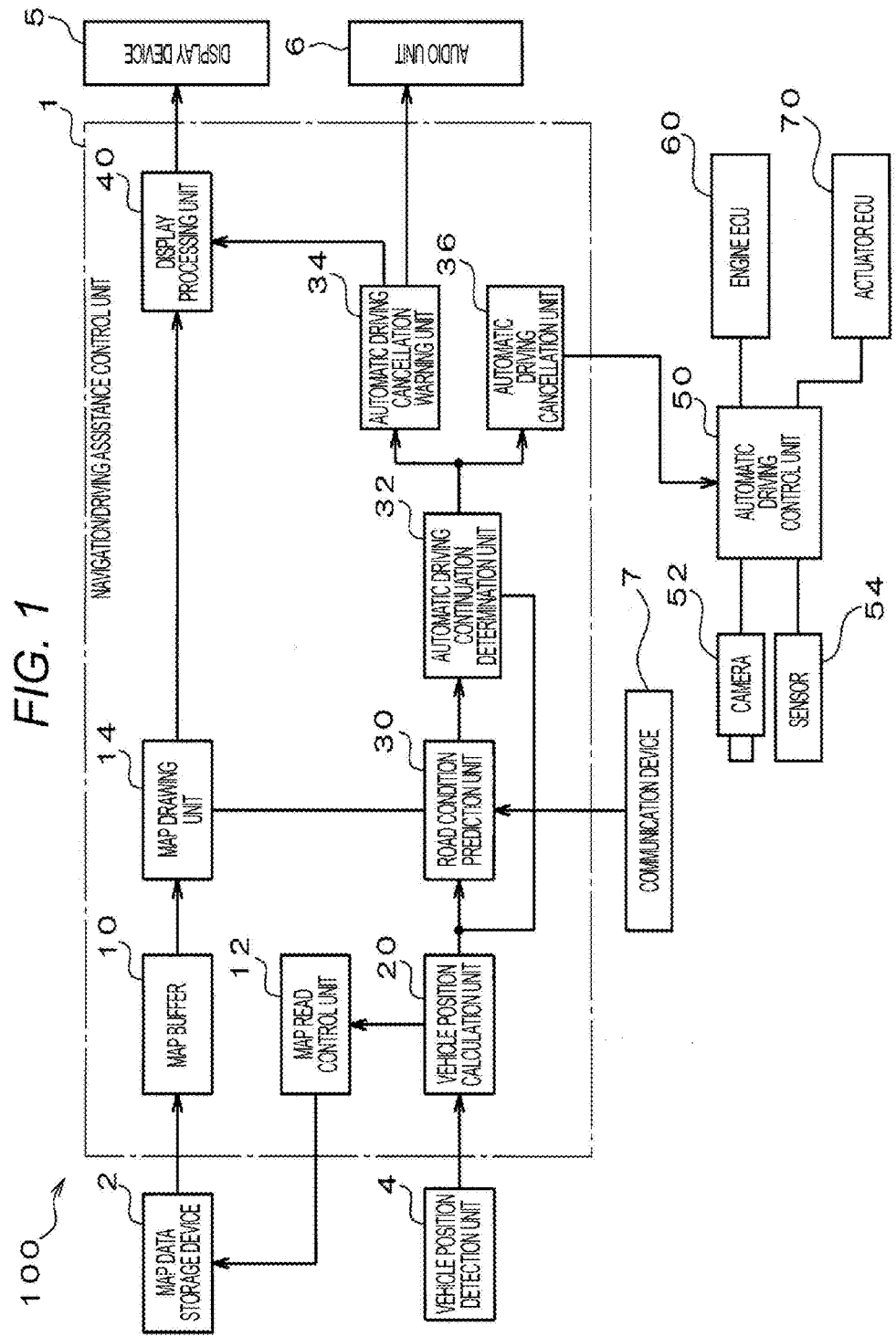
FIG. 1 is a diagram illustrating a detailed configuration of an in-vehicle system of an embodiment.

An embodiment of an in-vehicle system having a vehicle driving assistance apparatus according to the present disclosure will be explained with reference to the accompanying drawings. FIG. 1 is a diagram illustrating a detailed configuration of an in-vehicle system of an embodiment. As illustrated in FIG. 1, the in-vehicle system 100 includes a navigation/driving assistance control unit 1, a map data storage device 2, a vehicle position detection unit 4, a display device 5, an audio unit 6, a communication device 7, an automatic driving control unit 50, a camera 52, a sensor 54, an engine ECU 60, and an actuator ECU 70.

The navigation/driving assistance control unit 1 executes a predetermined operation program using a CPU, a ROM, a RAM or the like to execute a navigation operation such as map display and driving assistance operation such as cancellation warning or cancellation of automatic driving. The detailed configuration of the navigation/driving assistance control unit 1 will be described later.

The map data storage device 2 is a storage medium storing map data used in map display, a facility search, a route search and the like, and a reading device for reading the data. The map data storage device 2 stores map data in unit of rectangular-shaped sheet which is divided in a suitable size by longitude and latitude. Each sheet of the map data can be identified and read by specifying a sheet number. The map data storage device 2 is comprised of a hard disk device, a semiconductor memory or a DVD and a reading device for reading the data. Further, by replacing the map data storage device 2 with the communication device 7, map data may be obtained from an external map distribution server (not shown).

The vehicle position detection unit 4 has, for example, a GPS receiver, an orientation sensor, a distance sensor or the like, and detects a vehicle position (longitude, latitude) at a predetermined time, and outputs a detection result. The display device 5 includes, for example, an LCD (liquid crystal display unit) and displays a map image or the like around the vehicle position based on a video signal output from the navigation/driving assistance control unit 1. The audio unit 6 outputs, to a passenger room, automatic driving cancellation warning sounds or the like generated based on a sound signal input from the navigation/driving assistance control unit 1.

The communication device 7 obtains information (external information) used to predict a road condition by wirelessly communicating with an external device (not shown). For example, as the external device, there may be a VICS (Vehicle Information and Communication System, registered trademark) center, an external server, or the like. From the VICS center, external information such as traffic jam information, traffic hazard information (including weather information that indicates "freezing" of the road), traffic regulation information or the like can be obtained. From the external server, in addition to external information relevant to the information obtainable from the VICS center, external information of further detailed weather information (for example, information of snow-covered condition, strong wind or the like in a local area) can be obtained.

The automatic driving control unit 50 executes vehicle automatic driving based on a picture around the vehicle taken by the camera 52, various outputs from the sensor 54, and the like. Here, the "automatic driving" includes operation of various levels. For example, "pre-crush braking" that automatically applies braking when the sensor 54 detects an obstacle in front of the vehicle, a "lane keeping assist system" that maintains and adjusts the steering wheel orientation upon detecting white lines in front of the vehicle by the sensor 54, a "cruise control" or an "active-cruise control" that maintains speed constant upon adjusting the accelerator position, an "automatic traveling vehicle control device" disclosed in JP 10-309961 A, and the like are widely included. The automatic driving control unit 50 is connected to the engine ECU (electronic control unit) 60 that controls an engine and the actuator ECU 70 that controls various actuators that move an accelerator, a brake, a steering wheel and the like, and inputs various signals used in automatic driving to the engine ECU 60 and the actuator ECU 70. Here, since the present disclosure relates to cancellation of automatic driving, specific contents of automatic driving are not limited to the above, and may be realized by other methods.

Next, a detailed configuration of the navigation/driving assistance control unit 1 will be explained. The navigation/driving assistance control unit 1 illustrated in FIG. 1 includes a map buffer 10, a map read control unit 12, a map drawing unit 14, a vehicle position calculation unit 20, a road condition prediction unit 30, an automatic driving continuation determination unit 32, an automatic driving cancellation warning unit 34, an automatic driving cancellation unit 36, and a display processing unit 40.

The map buffer 10 temporarily stores map data read from the map data storage device 2. The map data includes at least data used to draw a map image and data indicating zones such as road types, tunnels, bridges and the like. The map read control unit 12 outputs a request for reading map data of a predetermined range to the map data storage device 2 according to a vehicle position calculated by the vehicle position calculation unit 20. The map drawing unit 14 executes a drawing process for displaying a map image on the display device 5 based on the map data stored in the map buffer 10 and creates map image drawing data.

The vehicle position calculation unit 20 calculates a vehicle position based on detection data output from the vehicle position detection unit 4 and, when the calculated vehicle position is not on the road in the map data, executes a map matching process for correcting the vehicle position. The road condition prediction unit 30 predicts, based on the information obtained via the communication device 7, a road condition at a position in front of the vehicle position detected (calculated) by the vehicle position calculation unit 20.

The automatic driving continuation determination unit 32 determines whether or not automatic driving at the position in front of the vehicle can be continued based on the road condition predicted by the road condition prediction unit 30. The automatic driving cancellation warning unit 34 warns of vehicle automatic driving cancellation when the distance to the position in front of the vehicle where the automatic driving continuation determination unit 32 determines that it is difficult to continue the vehicle automatic driving becomes equal to or less than a predetermined value A.

The automatic driving cancellation unit 36 cancels the automatic driving control by the automatic driving control unit 50 at a point before the position in front of the vehicle, when it is determined that the vehicle automatic driving is difficult, after warning of the cancellation by the automatic driving cancellation warning unit 34.

Turning, to the display processing unit 40, map image drawing data created by the map drawing unit 14 and cancellation warning image drawing data created by the automatic driving cancellation warning unit 34 are input and the display processing unit 40 displays, on the display device 5, a map image as overlaying a cancellation warning image (see later described FIGS. 3 and 4) for example.

The above vehicle position detection unit 4 and the vehicle position calculation unit 20 correspond to a vehicle position detector; the road condition prediction unit 30 corresponds to a road condition predictor; the automatic driving continuation determination unit 32 corresponds to an automatic driving continuation determiner; the automatic driving cancellation warning unit 34 corresponds to an automatic driving cancellation warner; the automatic driving cancellation unit 36 corresponds to an automatic driving canceller; the communication device 7 corresponds to a communicator; the automatic driving control unit 50 corresponds to an automatic driving controller; and the map drawing unit 14, display processing unit 40, and display device 5 correspond to a map display.

Figure 2:
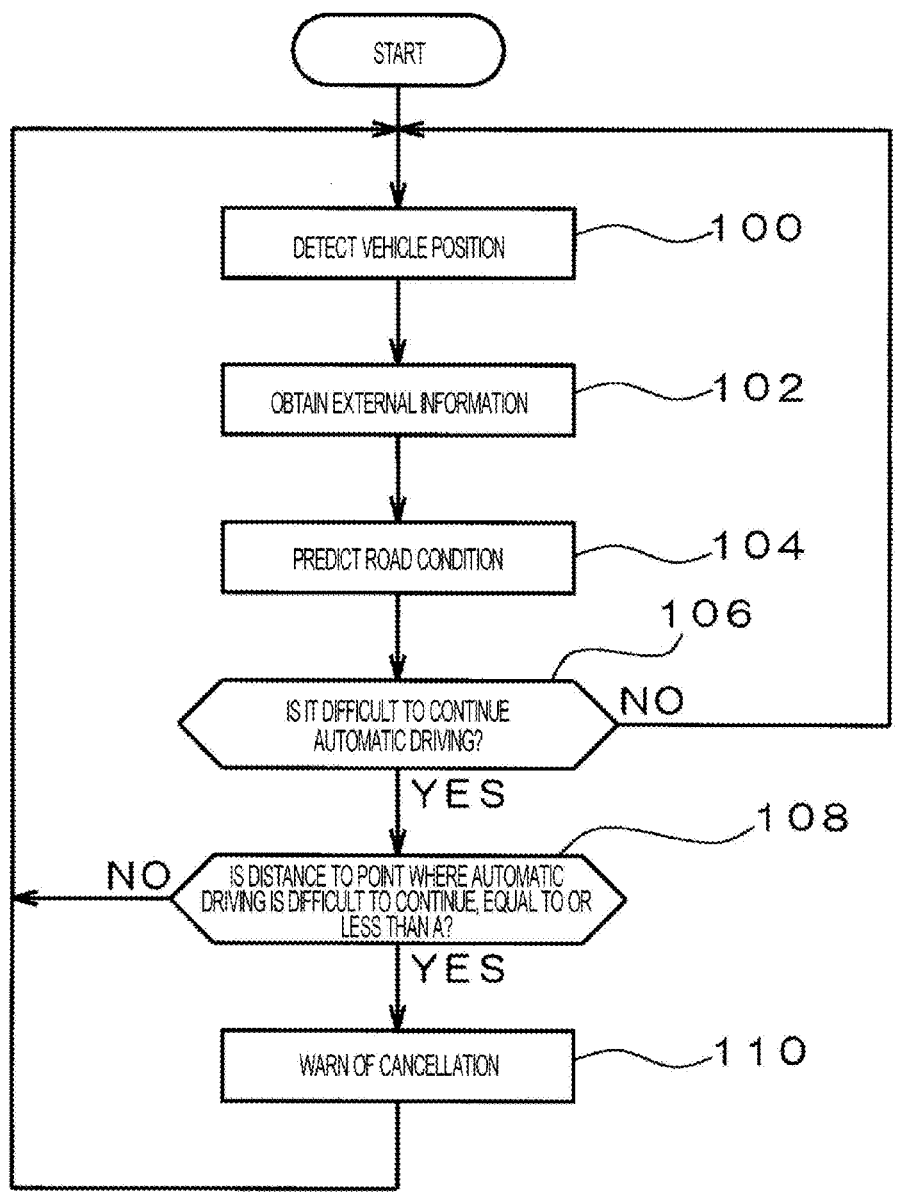
FIG. 2 is a flowchart illustrating an operation procedure, in a vehicle that is traveling by automatic driving, for predicting a road condition at a position in front of the vehicle and warning of automatic driving cancellation.

The in-vehicle system 100 according to the present embodiment has the above configuration, and its operation will be explained below. FIG. 2 is a flowchart illustrating an operation procedure for warning of automatic driving cancellation while predicting a road condition in front of a vehicle which is traveling by automatic driving.

When the vehicle position calculation unit 20 detects (calculates) a vehicle position (step 100), the road condition prediction unit 30 obtains, via the communication device 7, external information (external information such as traffic jam information, traffic hazard information and traffic regulation information obtained from the VICS center, external information such as traffic jam information and detailed weather information obtained from an external server) (step 102). Here, since the various external information that can be obtained via the communication device 7 includes external information which is not directly related to the operation according to the present disclosure, certain external information may be selectively obtained. For example, according to the present disclosure, since the external information is used to determine whether or not automatic driving can be continued at a position in front of the vehicle, it is preferable to extract external information used in the determination in advance and obtain only the relevant external information. As an example, consider a case where current automatic driving is canceled when a snow-covered condition, an icy road, jam or congestion, an accident, a disabled car, construction work, or a blocked street is occurring at a particular point on the street, such that only external information that notifies occurrence of those instances needs to be obtained.

Next, the road condition prediction unit 30 predicts a road condition at a position in front of the vehicle position based on the obtained external information (step 104). Further, the automatic driving continuation determination unit 32 determines whether or not the automatic driving can be continued at the position in front of the vehicle based on the predicted road condition (step 106). In a case where the automatic driving can be continued (in a case where the automatic driving is possible), a negative judgment is made and the process returns to step 100 to repeat the operation after detection of the vehicle position.

Further, in a case where it is difficult to continue the automatic driving, a positive judgment is made in the determination of step 106. Next, the automatic driving cancellation warning unit 34 determines whether or not the distance to the point where it is difficult to continue the automatic driving is equal to or less than the predetermined value A (step 108). When the distance is greater than the predetermined value A, a negative judgment is made and the process returns to step 100 to repeat the operation after the vehicle position detection.

Further, when the distance to the point where it is difficult to continue the automatic driving becomes less than the predetermined value A, a positive judgment is made in the determination of step 108. Next, the automatic driving cancellation warning unit 34 warns of automatic driving cancellation (step 110). After that, the process returns to step 100 and the operation after that the vehicle position detection is repeated.

Figure 3:
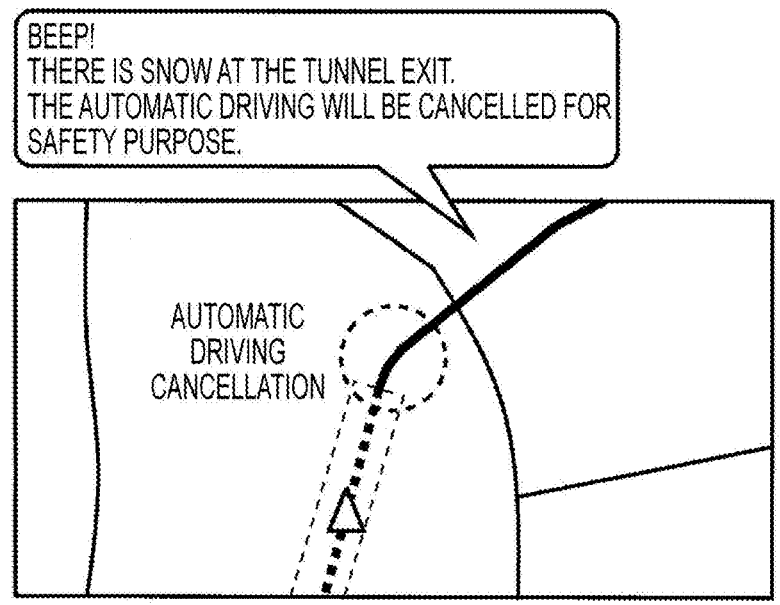
FIG. 3 is a diagram illustrating an illustrative example of warning of automatic driving cancellation.

FIG. 3 is a diagram illustrating an example of an automatic driving cancellation warning. In the example illustrated in FIG. 3, when it is found that there is a snow-covered condition near an exit of a tunnel based on the external information, at a point with a distance A from the tunnel exit, an automatic driving cancellation warning sound is output: "Beep! (sound effect). There is snow at the tunnel exit. The automatic driving will be canceled for safety purpose." At the same time, a text, "Automatic driving cancellation," is displayed at the tunnel exit on the map as being drawn with a circle (dotted line) to emphasize the exit area.

Figure 4:
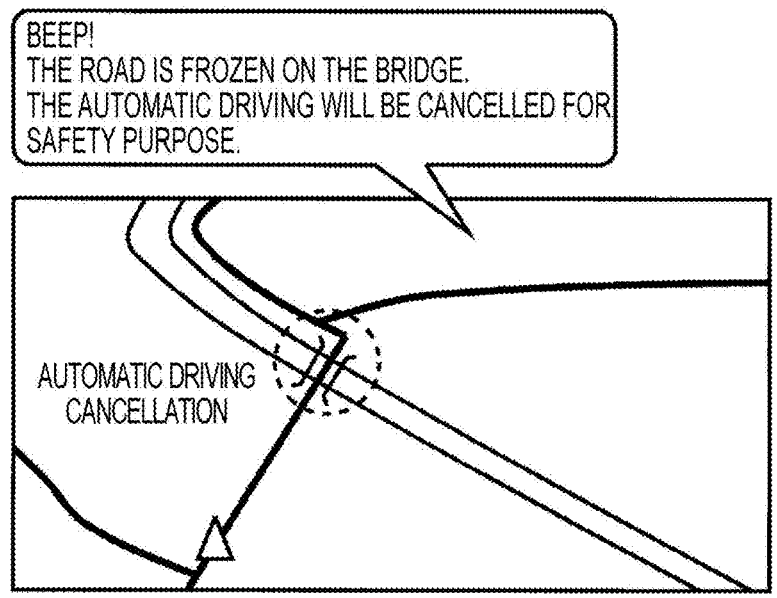
FIG. 4 is a diagram illustrating another illustrative example of warning of automatic driving cancellation.

FIG. 4 is a diagram illustrating another example of the automatic driving cancellation warning. In the example illustrated in FIG. 4, when it is found that the road on the bridge is frozen based on the external information, at a point with a distance A from the bridge, an automatic driving cancellation warning sound is output: "Beep! (sound effect). The road is frozen on the bridge. The automatic driving will be canceled for safety purpose." At the same time, a text, "Automatic driving cancellation," is displayed near the road on the bridge on the map as being drawn with a circle (dotted line) to emphasize the road on the bride.

Figure 5:
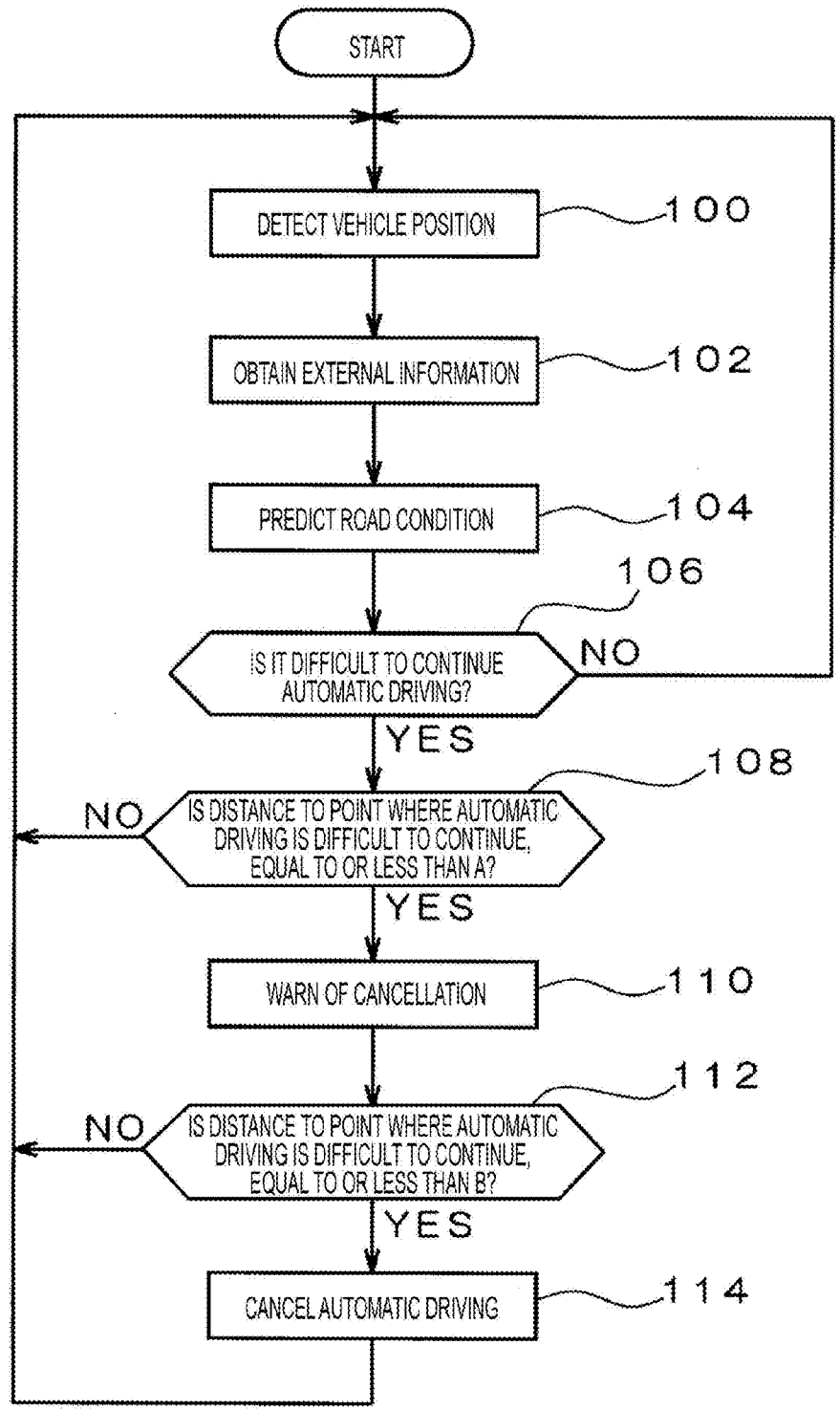
FIG. 5 is a flowchart illustrating an operation procedure, in a vehicle traveling by automatic driving, for cancelling the automatic driving after predicting a road condition at a position in front of the vehicle and warning of automatic driving cancellation.

FIG. 5 is a flowchart illustrating an operation procedure of cancelling automatic driving after predicting a road condition in front of the vehicle that is travelling by automatic driving and warning of an automatic driving cancellation. In the operation procedure illustrated in FIG. 5, there is a difference from the operation procedure illustrated in FIG. 2 in that steps 112 and 114 are added after step 110. Explanation will be given below focusing on the differences.

In step 110, after the automatic driving cancellation is warned by the automatic driving cancellation warning unit 34, the automatic driving cancellation unit 36 determines whether or not the distance to the point where it is difficult to continue the automatic driving becomes equal to or less than a predetermined value B (<A) (step 112). When the distance is greater than the predetermined value B, a negative judgment is made and the process returns to step 100 to repeat operation after the vehicle position detection.

Further, when the distance to the point where it is difficult to continue the automatic driving becomes equal to or less than the predetermined value B, a positive judgment is made in the determination of step 112. Next, the automatic driving cancellation unit 36 gives an instruction to the automatic driving control unit 50 to cancel the automatic driving (step 114). After that, returning to step 100, the operation after the vehicle position detection is repeated.

As described above, according to the in-vehicle system 100 of the present embodiment, in a vehicle traveling by automatic driving, since it is determined in advance that it is difficult to continue automatic driving and an automatic driving cancellation is warned, the driver can be ready for the automatic driving cancellation beforehand. Further, upon receiving the warning, the driver is also able to switch from the automatic driving to manual driving at his or her will (for example, switching by manually operating a drive mode switching button).

Further, by predicting a road condition according to the information obtained from an external device (the VICS center or an external server), an accurate prediction reflecting real-time changes of road conditions can be achieved.

Further, since a cancellation warning is performed at a position with a certain distance A from the point where it is difficult to continue the automatic driving, the driver can prepare for the automatic driving cancellation in advance while driving the certain distance A.

Further, since the control of automatic driving is canceled at a point before the position, when it is determined that it is difficult to continue the vehicle automatic driving, and after the warning of the cancellation, the driver can calmly shift to manual driving after the automatic driving is cancelled.

Further, when traveling on a snow-covered road or an icy rode, it is preferable to cancel the automatic driving in order to be ready for unexpected situations. As such, by obtaining weather information in advance, especially information of a snow-covered condition and an icy road, to predict a road condition, warning of automatic driving cancellation can be performed at preferred timing.

Further, regarding congestion, jam, construction, accidents or the like, since it is difficult to predict when or how those occur, it is preferable to cancel automatic driving and handle those conditions by driving manually. Thus, by obtaining such information in advance and predicting a road condition, warning of automatic driving cancellation can be performed at preferred timing.

Further, by displaying a map image around the vehicle position with the vehicle position and the position in front of the vehicle where is determined to be difficult to continue the automatic driving, the driver can confirm the position in front of the vehicle where it is difficult to continue the automatic driving on the map image and be ready for the automatic driving cancellation before the vehicle arrives at the position in front of the vehicle.

Here, the present disclosure is not limited to the above embodiment and various modifications can be made within the scope of the present disclosure. For example, as illustrative examples are given referring to FIGS. 3 and 4, since a snow-covered condition at a tunnel exit and an icy road on a bridge are conditions which relatively occur in common, the automatic driving continuation determination unit 32 can determine whether the vehicle automatic driving can be continued focusing on the position in front of the vehicle corresponding to a tunnel exit and a bridge. It may be assumed that, when an accumulated snow warning or the like of an area including a tunnel exit has been issued, a snow-covered condition at the tunnel exit can be predicted or, when the temperature at an area including a bridge is equal to or lower than zero degree (Celsius), an icy road on the bridge can be predicted. By focusing on those points, a situation where it is difficult to continue automatic driving can be determined accurately or with an allowance.

As described above, according to the present disclosure, when a vehicle is traveling by automatic driving, since a case where it becomes difficult to continue automatic driving is determined in advance and an automatic driving cancellation is warned in advance, the driver can be ready for the automatic driving cancellation beforehand.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teaching of the invention without departing from the central scope thereof. Therefore, it is intended that this invention not be limited to the particular embodiments disclosed, but that the invention will include all embodiments falling within the scope of the appended claims.

What is claimed is:

1. A vehicle driving assistance apparatus comprising:
a vehicle position detector configured to detect a vehicle position of a vehicle;
a road condition predictor configured to predict a road condition at a position in front of the vehicle position detected by the vehicle position detector;
an automatic driving continuation determiner configured to determine whether or not vehicle automatic driving can be continued at the position in front of the vehicle based on the road condition predicted by the road condition predictor;
an automatic driving cancellation warner configured to warn of vehicle automatic driving cancellation when the automatic driving continuation determiner determines that the vehicle automatic driving cannot be continued at the position in front of the vehicle; and
an automatic driving canceller configured to automatically cancel the vehicle automatic driving before the position in front of the vehicle at a first distance larger than a first predetermined fixed value, when it is determined that the vehicle automatic driving cannot be continued at the position in front of the vehicle, after warning of the cancellation by the automatic driving cancellation warner;
wherein the automatic driving cancellation warner warns of the cancellation when a second distance to the position in front of the vehicle, when it is determined that the vehicle automatic driving cannot be continued at the position in front of the vehicle, becomes equal to or less than a second predetermined fixed value, the second predetermined fixed value being larger than the first predetermined fixed value; and
wherein, when the automatic driving continuation determiner determines that the position in front of the vehicle corresponds to a tunnel exit and the vehicle automatic driving cannot be continued at the tunnel exit due to a weather-induced road condition change, the automatic driving cancellation warner warns of the cancellation with an indication that the automatic driving will be canceled before the tunnel exit.

2. The vehicle driving assistance apparatus according to claim 1, wherein the road condition predictor predicts the road condition based on information obtained from an external device.

3. The vehicle driving assistance apparatus according to claim 2, wherein the information which is used to predict the road condition obtained from the external device comprises weather information in an area around the vehicle.

4. The vehicle driving assistance apparatus according to claim 3,
wherein the automatic driving continuation determiner determines the vehicle automatic driving cannot be continued at the position in front of the vehicle when the obtained weather information indicates at least one of a snow-covered condition and an icy road.

5. The vehicle driving assistance apparatus according to claim 3, further comprising:
a map display configured to display a map image around the vehicle position detected by the vehicle position detector with the position in front of the vehicle, when it is determined that the vehicle automatic driving cannot be continued at the position in front of the vehicle.

6. The vehicle driving assistance apparatus according to claim 2,
wherein the information which is obtained from the external device and used to predict the road condition comprises road traffic information including a congesting area, a jamming area, a construction area, or an accident occurrence area of streets.

7. The vehicle driving assistance apparatus of claim 1, wherein to automatically cancel the vehicle automatic driving, the automatic driving canceller returns the vehicle to a manual driving mode at the first distance.

8. The vehicle driving assistance apparatus of claim 1, wherein to automatically cancel the vehicle automatic driving, the automatic driving canceller returns control of the vehicle to a driver of the vehicle at the first distance.

9. The vehicle driving assistance apparatus according to claim 1, wherein the first predetermined fixed value is nonzero.

10. A vehicle driving assistance method comprising:
predicting, by a road condition predictor, a road condition at a position in front of a vehicle position detected by a vehicle position detector, in relation to a vehicle;
determining, by an automatic driving continuation determiner, whether or not vehicle automatic driving can be continued at the position in front based on the road condition predicted by the road condition predictor;
warning, by an automatic driving cancellation warner, cancellation of the vehicle automatic driving when the automatic driving continuation determiner determines that the vehicle automatic driving cannot be continued at the position in front of the vehicle, and
cancelling, automatically by an automatic driving canceller, the vehicle automatic driving at a point before the position in front of the vehicle at a first distance larger than a first predetermined fixed value, when it is determined that the vehicle automatic driving cannot be continued at the position in front of the vehicle, after warning of the cancellation by the automatic driving cancellation warner;
wherein the automatic driving cancellation warner warns of the cancellation when second distance to the position in front of the vehicle, when it is determined that the vehicle automatic driving cannot be continued at the position in front of the vehicle, becomes equal to or less than a second predetermined fixed value, the second predetermined fixed value being larger than the first predetermined fixed value; and
wherein, when the automatic driving continuation determiner determines that the position in front of the vehicle corresponds to a tunnel exit and the vehicle automatic driving cannot be continued at the tunnel exit due to a weather-induced road condition change, the automatic driving cancellation warner warns of the cancellation with an indication that the automatic driving will be canceled before the tunnel exit.

11. The vehicle driving assistance method of claim 10, further comprising:
obtaining information used to predict the road condition from an external device,
wherein the road condition predictor predicts the road condition based on the information obtained from the external device.

12. The vehicle driving assistance method of claim 11, wherein the information which is used to predict the road condition comprises weather information in an area around the vehicle.

13. The vehicle driving assistance method of claim 12, wherein the automatic driving continuation determiner determines that the vehicle automatic driving cannot be continued at the position in front of the vehicle when the obtained weather information indicates at least one of a snow-covered condition and an icy road.

14. The vehicle driving assistance method of claim 12, further comprising:
displaying, by a map display, a map image around the vehicle position detected by the vehicle position detector with the position in front of the vehicle, when it is determined that the vehicle automatic driving cannot be continued at the position in front of the vehicle.

15. The vehicle driving assistance method of claim 10, wherein cancelling the vehicle automatic driving comprises returning, automatically by the automatic driving canceller, the vehicle to a manual driving mode at the first distance.

16. The vehicle driving assistance apparatus of claim 10, wherein cancelling the vehicle automatic driving comprises returning, automatically by the automatic driving canceller, control of the vehicle to a driver of the vehicle at the first distance.

17. A vehicle driving assistance apparatus comprising:
a vehicle position detector configured to detect a vehicle position of a vehicle;
a road condition predictor configured to predict a weather-induced road condition change at a position of a tunnel exit in front of the vehicle position detected by the vehicle position detector;
an automatic driving continuation determiner configured to determine whether or not vehicle automatic driving can be continued at the position of the tunnel exit in front of the vehicle based on the weather-induced road condition change predicted by the road condition predictor;
an automatic driving cancellation warner configured to issue a warning indicating the tunnel exit and that the vehicle automatic driving will be canceled when the automatic driving continuation determiner determines that the vehicle automatic driving cannot be continued at the position of the tunnel exit in front of the vehicle and when a distance from the vehicle position to the position of the tunnel exit becomes equal to or less than a fixed predetermined warning distance; and
an automatic driving canceller configured to automatically cancel the vehicle automatic driving at another distance larger than a fixed predetermined cancelling distance before the position of the tunnel exit, when it is determined that the vehicle automatic driving cannot be continued at the position of the tunnel exit, after issuing the warning by the automatic driving cancellation warner.

18. The vehicle driving assistance apparatus of claim 17, wherein the warning comprises an audio warning or a display of the tunnel exit.

19. The vehicle driving assistance apparatus of claim 17, wherein the warning comprises a voice prompting the tunnel exit and a cancellation of the automatic driving before the tunnel exit.

* * * * *